United States Patent [19]
Leung et al.

[11] Patent Number: 5,258,084
[45] Date of Patent: Nov. 2, 1993

[54] HIGH FLEXURAL STRENGTH CERAMIC FIBER REINFORCED SILICON CARBOXIDE COMPOSITE

[75] Inventors: Rober Y. Leung, Schaumburg; Gerald T. Stranford, Palatine; Stephen T. Gonczy, Prospect, all of Ill.

[73] Assignee: Allied-Signal Inc., Morris Township, Morris County, N.J.

[21] Appl. No.: 638,109

[22] Filed: Dec. 20, 1990

Related U.S. Application Data

[62] Division of Ser. No. 464,470, Jan. 12, 1990.

[51] Int. Cl.$^5$ ............................................. C03B 29/00
[52] U.S. Cl. ....................................... 156/89; 156/155; 156/325; 156/329; 264/29.5; 264/29.6; 264/29.7; 264/62
[58] Field of Search ............... 428/367, 368, 446, 447, 428/428, 429, 378, 698; 501/12, 17, 32; 264/60, 62, 65, 66, 29.6, 29.7, 29.5; 427/249, 227, 228; 156/89, 155, 325, 329

[56] References Cited

U.S. PATENT DOCUMENTS

| | | | |
|---|---|---|---|
| 3,944,519 | 3/1976 | Mink et al. | 360/46.5 UA |
| 4,215,161 | 7/1980 | Seibold et al. | 427/228 |
| 4,234,713 | 11/1980 | LeGrow | 528/15 |
| 4,267,211 | 5/1981 | Yajima et al. | 427/228 |
| 4,460,638 | 7/1984 | Haluska | 428/224 |
| 4,460,639 | 7/1984 | Chi et al. | 428/224 |
| 4,460,640 | 7/1984 | Chi et al. | 428/224 |
| 4,618,522 | 10/1986 | Modic | 428/145 |
| 4,935,387 | 6/1990 | Beall et al. | 501/3 |
| 5,009,823 | 4/1991 | Kromrey | 264/29.7 |
| 5,015,605 | 5/1991 | Frey et al. | 501/12 |
| 5,021,369 | 6/1991 | Ackerman et al. | 501/95 |
| 5,039,635 | 8/1991 | Stempin et al. | 501/95 |
| 5,132,178 | 7/1992 | Chyung et al. | 428/372 |
| 5,164,341 | 11/1992 | Chyung et al. | 501/8 |

OTHER PUBLICATIONS

Prewo et al., Ceramic Bulletin, vol. 65, No. 2 (1986).

*Primary Examiner*—Donald P. Walsh
*Assistant Examiner*—Ngoclan T. Mai
*Attorney, Agent, or Firm*—Harold N. Wells; Mary Jo Boldingh; Gerhard H. Fuchs

[57] ABSTRACT

An improved fiber reinforced glass composite includes a carbon-coated refractory fiber in a matrix of a black glass ceramic having the empirical formula SiCxOy where x ranges from about 0.5 to about 2.0, preferably 0.9 to 1.6 and y ranges from about 0.5 to 3.0, preferably 0.7 to 1.8. Preferably the black glass ceramic is derived from cyclosiloxane monomers containing a vinyl group attached to silicon and/or a hydride-silicon group.

18 Claims, 1 Drawing Sheet

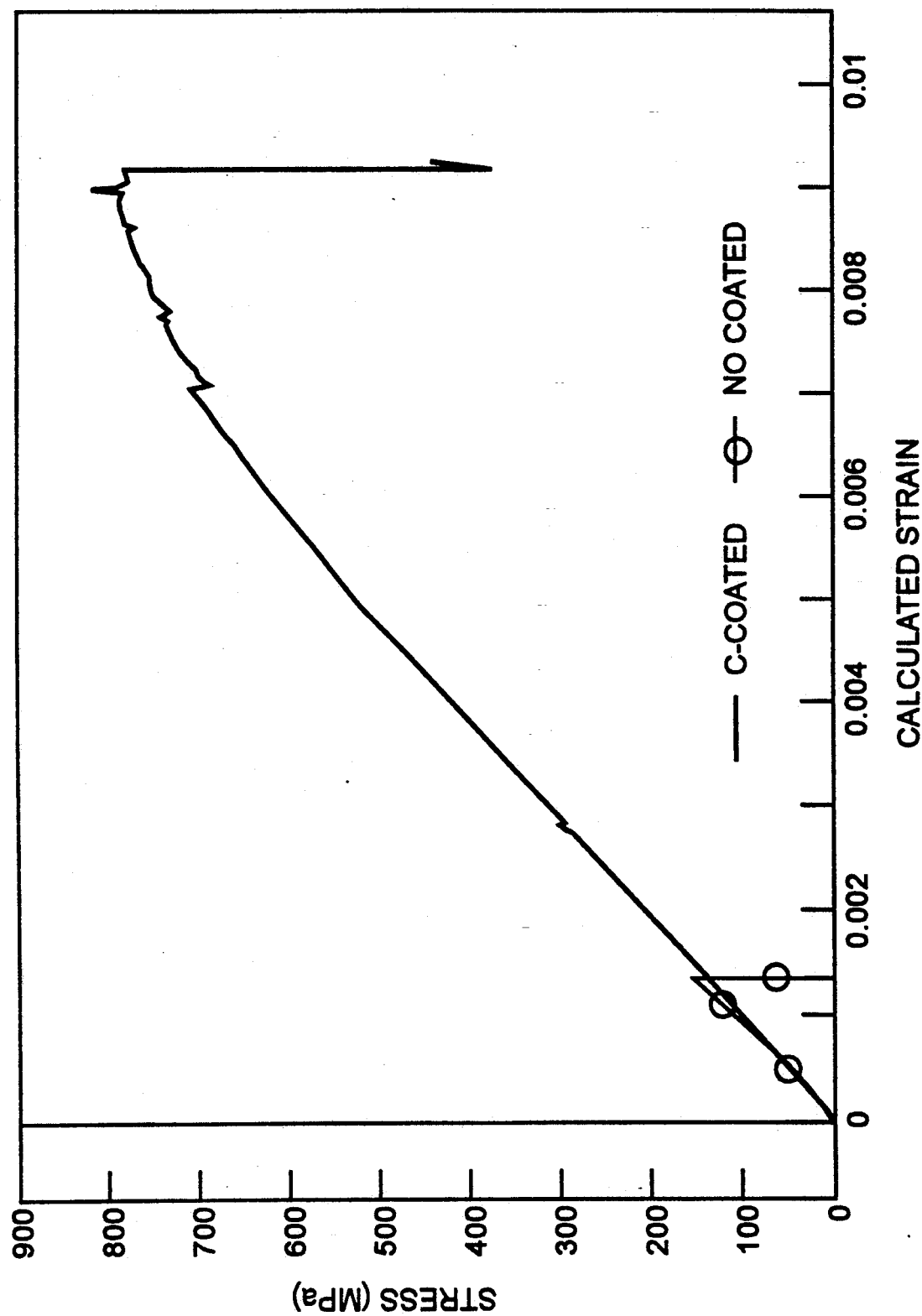

HIGH FLEXURAL STRENGTH CERAMIC FIBER REINFORCED SILICON CARBOXIDE COMPOSITE

This application is a division, of application Ser. No. 07/464,470, filed Jan. 12, 1990.

PRIOR ART

The invention relates generally to composite laminates in which a matrix material is reinforced with fibers. Laminates with a polymer matrix are widely used for various purposes, but they are not generally applicable in situations where temperatures are expected to be above about 300° C. The present invention relates to ceramic fiber reinforced-glass matrix composites having application at temperatures which would destroy conventional polymeric materials.

Matrices having enhanced performance have been suggested for use with fibers having high strength at elevated temperatures. Examples of such matrix materials are the glass and glass ceramics (Prewo et al., Ceramic Bulletin, Vol. 65, No. 2, 1986).

In U.S. Ser. No. 002,049 a ceramic composition designated "black glass" is disclosed which has an empirical formula $SiC_xO_y$ where x ranges from 0.5 to about 2.0 and y ranges from about 0.5 to about 3.0, preferably x ranges from 0.9 to 1.6 and y ranges from 0.7-1.8. Such a ceramic material has a higher carbon content than prior art materials and is very resistant to high temperatures—up to about 1400° C. This black glass material is produced by reacting in the presence of a hydrosilylation catalyst a cyclosiloxane having a vinyl group with a cyclosiloxane having a hydrogen group to form a polymer, which is subsequently pyrolyzed to black glass. The present invention involves the application of such black glass to reinforcing fibers to form laminates very useful in high temperature applications.

In U.S. Pat. No. 4,460,638 a fiber-reinforced glass composite is disclosed which employs high modulus fibers in a matrix of a pyrolyzed silazane polymer. Another possible matrix material is the resin sol of an organosilsesquioxane, as described in U.S. Pat. No. 4,460,639. However, such materials are hydrolyzed, and since they release alcohols and contain excess water, they must be carefully dried to avoid fissures in the curing process.

Another U.S. Pat. No. 4,460,640, disclosed related fiber reinforced glass composites using organopolysiloxane resins of U.S. Pat. Nos. 3,944,519 and 4,234,713 which employ crosslinking by the reaction of ≡SiH groups to $CH_2$=CHSi≡ groups. These later two patents have in common the use of organosilsesquioxanes having $C_6H_5SiO_{3/2}$ units, which have been considered necessary by the patentees to achieve a flowable resin capable of forming a laminate. A disadvantage of such $C_6H_5SiO_{3/2}$ units is their tendency to produce free carbon when pyrolyzed. The present invention requires no such $C_6H_5SiO_{3/2}$ units and still provides a flowable resin, and does not produce easily oxidized carbon.

Another disadvantage of the organopolysiloxanes used in the '640 patent is their sensitivity to water as indicated in the requirement that the solvent used be essentially water-free. The resins contain silanol groups and when these are hydrolyzed they form an infusible and insoluble gel. The present invention requires no such silanol groups and is thus insensitive to the presence of water. In addition, the organopolysiloxanes of the '640 patent may not have a long shelf life while those of the present invention remain stable for extended periods. Still another disadvantage for the organopolysiloxanes disclosed in the '640 patent is that they require a partial curing step before pressing and final curing. This operation is difficult to carry out and may prevent satisfactory lamination if the polymer is over cured. The present invention can be carried out after coating the fibers and requires no pre-curing step.

In co-pending U.S. patent application Ser. No. 07/426,820 composites of refractory fibers with a black glass matrix were disclosed. Such composites have good physical properties but tend to exhibit brittle fracture with little evidence of fiber pullout. The composites reported in U.S. Pat. Nos. 4,460,639 and 4,460,640 also exhibit brittle fracture with a flexural strength of less than 308 MPa.

Ceramic matrix composites which combine whiskers, particulates, staples, or continuous fibers with ceramic matrix offer a potential to overcome the catastrophic brittle failure inherent to monolithic ceramics. Among these reinforcement types, continuous fiber is the most effective means known for toughening ceramics. If brittle fracture is replaced by the graceful fibrous fracture, ceramic composites may be used reliably as an engineering material for structural and other high performance applications.

The type of failure is to large extent determined by the nature of the interface between the reinforcement fiber and the surrounding matrix. In ceramic composites, high toughness results when energy is absorbed as fibers pull out from the matrix as the composite cracks. Thus, a low interfacial stress or friction is needed to ensure fibrous fracture. If a strong interfacial bond exists, the crack will cut through the fiber without pulling out the fiber, resulting in a fracture behavior not much different from unreinforced monolithic ceramics. Our present invention relates to the use of a carbon interface in a silicon carboxide 'black' glass matrix, producing a composite having a high strain-to-failure and exhibiting fibrous fracture.

SUMMARY OF THE INVENTION

An improved fiber reinforced glass composite of the invention comprises (a) at least one carbon-coated refractory fiber selected from the group consisting of boron, silicon carbide, graphite, silica, quartz, S-glass, E-glass, alumina, aluminosilicate, boron nitride, silicon nitride, boron carbide, titanium boride, titanium carbide, zirconium oxide, and zirconia-toughened alumina and, (b) a carbon-containing black glass ceramic composition having the empirical formula $SiC_xO_y$ where x ranges from about 0.5 to about 2.0, preferably from 0.9 to 1.6, and y ranges from about 0.5 to about 3.0, preferably from 0.7 to 1.8.

In a preferred embodiment, the black glass ceramic composition (b) of the invention is the pyrolyzed reaction product of a polymer prepared from (1) a cyclosiloxane monomer having the formula

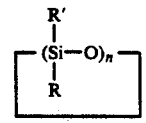

where n is an integer from 3 to about 30, R is hydrogen, and R' is an alkene of from 2 to about 20 carbon atoms in which one vinyl carbon atom is directly bonded to silicon or (2) two or more different cyclosiloxane monomers having the formula of (1) where for at least one monomer R is hydrogen and R' is an alkyl group having from 1 to about 20 carbon atoms and for the other monomers R is an alkene from about 2 to about 20 carbon atoms in which one vinyl carbon is directly bonded to silicon and R' is an alkyl group of from 1 to about 20 carbon atoms, said polymerization reaction taking place in the presence of an effective amount of hydrosilylation catalyst. The polymer product is pyrolyzed in a non-oxidizing atmosphere to a temperature in the range of about 800° C. to about 1400° C. to produce the black glass ceramic.

In another embodiment the invention comprises a method of preparing a fiber reinforced glass composite wherein the cyclosiloxane reaction product described above is combined with carbon-coated refractory fibers which may be in the form of woven fabric or unidirectionally aligned fibers. Plies of the coated fibers may be laid-up to form a green laminate and thereafter pyrolyzed in a non-oxidizing atmosphere at a temperature between about 800° C. and about 1400° C., preferably about 850° C., to form the black glass composite. The laminate may be reimpregnated with polymer solution and repyrolyzed in order to increase density. Alternatively, a resin transfer technique may be used in which fibers, optionally having a carbon coating, are placed in a mold and the black glass matrix precursor is added to fill the mold before curing to form a green molded product.

The refractory fibers are coated with a carbon layer about 0.01 μm to 5 μm thick prior to fabrication and pyrolysis of the cyclosiloxanes to form the black glass matrix. Preferred methods of forming such carbon coatings are chemical vapor deposition, solution coating, and pyrolysis of organic polymers such as carbon pitch and phenolics.

These uniaxial silicon carbide fiber reinforced black glass composites show flexural strength greater than about 750 MPa at room temperature and fibrous, graceful fracture at temperatures below about 600° C. A five-fold increase in flexural strength and a six-fold increase in strain at maximum stress has been obtained as compared with black glass composites without a carbon interfacial coating.

BRIEF DESCRIPTION OF THE DRAWINGS

The sole FIG. is a graph comparing the flexural strengths of composites of uncoated and coated Nicalon ® fibers in black glass matrices.

DESCRIPTION OF THE PREFERRED EMBODIMENTS

Black Glass Ceramic

The black glass ceramic used as the matrix has an empirical formula $SiC_xO_y$ wherein x ranges from about 0.5 to about 2.0, preferably 0.9–1.6, and y ranges from about 0.5 to about 3.0, preferably 0.7–1.8, whereby the carbon content ranges from about 10% to about 40% by weight. The black glass ceramic is the product of the pyrolysis in a non-oxidizing atmosphere at temperatures between about 800° C. and about 1400° C. of a polymer made from certain siloxane monomers.

The polymer precursor of the black glass ceramic may be prepared by subjecting a mixture containing cyclosiloxanes of from 3 to 30 silicon atoms to a temperature in the range of from about 10° C. to about 300° C. in the presence of 1–200 wt. ppm of a platinum hydrosilylation catalyst for a time in the range of from about 1 minute to about 600 minutes. When the polymer is placed in a nonoxidizing atmosphere, such as nitrogen, and pyrolyzed at a temperature in the range from about 800° C. to about 1400° C. for a time in the range of from about 1 hour to about 300 hours, black glass results. The polymer formation takes advantage of the fact that a silicon-hydride will react with a silicon-vinyl group to form a silicon-carbon-carbon-silicon bonded chain, thereby forming a network polymer. For this reason, each monomer cyclosiloxane must contain either a silicon-hydride bond or a silicon-vinyl bond or both. A silicon-hydride bond refers to a silicon atom bonded directly to a hydrogen atom and a silicon-vinyl bond refers to a silicon atom bonded directly to an alkene carbon, i.e., it is connected to another carbon atom by a double bond.

The polymer precursor for the black glass ceramic may be defined generally as the reaction product of (1) a cyclosiloxane monomer having the formula

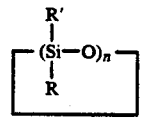

where n is an integer from 3 to 30, R is hydrogen, and R' is an alkene of from 2 to 20 carbon atoms in which one vinyl carbon atom is directly bonded to silicon or (2) two or more different cyclosiloxane monomers having the formula of (1) where for at least one monomer R is hydrogen and R' is an alkyl group having from 1 to 20 carbon atoms and for the other monomers R is an alkene from about 2 to 20 carbon atoms in which one vinyl carbon is directly bonded to silicon and R' is an alkyl group of from 1 to 20 carbon atoms, said reaction taking place in the presence of an effective amount of hydrosilylation catalyst.

The black glass ceramic may be prepared from a cyclosiloxane polymer precursor wherein both the requisite silicon-hydride bond and the silicon-vinyl bond are present in one molecule, for example, 1,3,5,7-tetravinyl-1,3,5,7-tetrahydrocyclotetrasiloxane. Alternatively, two or more cyclosiloxane monomers may be polymerized. Such monomers would contain either a silicon hydride bond or a silicon-vinyl bond and the ratio of the two types of bonds should be about 1:1, more broadly about 1:9 to 9:1.

Examples of such cyclosiloxanes include, but are not limited to:
1,3,5,7-tetramethyltetrahydrocyclotetrasiloxane,
1,3,5,7-tetravinyltetrahydrocyclotetrasiloxane,
1,3,5,7-tetravinyltetraethylcyclotetrasiloxane,
1,3,5,7-tetravinyltetramethylcyclotetrasiloxane,
1,3,5-trimethyltrivinylcyclotrisiloxane,
1,3,5-trivinyltrihydrocyclotrisiloxane,
1,3,5-trimethyltrihydrocyclotrisiloxane,
1,3,5,7,9-pentavinylpentahydrocyclopentasiloxane,
1,3,5,7,9-pentavinylpentamethylcyclopentasiloxane,
1,1,3,3,5,5,7,7-octavinylcyclotetrasiloxane,
1,1,3,3,5,5,7,7-octahydrocyclotetrasiloxane,
1,3,5,7,9,11-hexavinylhexamethylcyclohexasiloxane,
1,3,5,7,9,11-hexamethylhexahydrocyclohexasiloxane,
1,3,5,7,9,11,13,15,17,19-decavinyldecahydrocyclodecasiloxane, 1,3,5,7,9,11,13,15,17,19,21,23,25,27,29-pentadecavinyl-pentadecahydrocyclopentadecasiloxane
1,3,5,7-tetrapropenyltetrahydrocyclotetrasiloxane,
1,3,5,7-tetrapentenyltetrapentylcyclotetrasiloxane and
1,3,5,7,9-pentadecenylpentapropylcyclopentasiloxane.

It will be understood by those skilled in the art that while the siloxane monomers may be pure species, it will be frequently desirable to use mixtures of such monomers, in which a single species is predominant. Mixtures in which the tetramers predominate have been found particularly useful.

While the reaction works best if platinum is the hydrosilylation catalyst, other catalysts such as cobalt and manganese carbonyl will perform adequately. The catalyst can be dispersed as a solid or can be used as a solution when added to the cyclosiloxane monomer. With platinum, about 1 to 200 wt. ppm, preferably 1 to 30 wt. ppm will be employed as the catalyst.

Black glass precursor polymer may be prepared from either bulk or solution polymerization. In bulk polymerization, neat monomer liquid, i.e., without the presence of solvents reacts to form oligomers or high molecular weight polymers. In bulk polymerization, a solid gel can be formed without entrapping solvent. It is particularly useful for impregnating porous composites to increase density. Solution polymerization refers to polymerizing monomers in the presence of an unreactive solvent. Resin used in impregnating fibers to form prepreg in our invention preferably is prepared by solution polymerization. The advantage of solution polymerization is the ease of controlling resin characteristics. It is possible but very difficult to produce B-stage resin suitable for prepregs with consistent characteristics by bulk polymerization. In the present invention, soluble resin with the desirable viscosity, tackiness, and flowability suitable for prepregging and laminating can be obtained consistently using solution polymerization process. The production of easily handleable and consistent resin is very critical in composite fabrication.

Fibers

Reinforcing fibers useful in the composites of the invention are refractory fibers which are of interest for applications where superior physical properties are needed. They include such materials as boron, silicon carbide, graphite, silica, quartz, S-glass, E-glass, alumina, aluminosilicates, boron nitride, silicon nitride, boron carbide, titanium boride, titanium carbide, zirconium oxide, and zirconia-toughened alumina.

The fibers may have various sizes and forms. They may be monofilaments from 1 $\mu$m to 200 $\mu$m diameter or tows of 200 to 2000 filaments. When used in composites of the invention they may be woven into fabrics, pressed into mats, or unidirectionally aligned with the fibers oriented as desired to obtain the needed physical properties.

An important factor in the performance of the black glass composites is the bond between the fibers and the black glass matrix. Consequently, where improved tensile strength is desired, the fibers are provided with a carbon coating which reduces the bonding between the fibers and the black glass matrix. The surface sizings found on fibers as received or produced may be removed by solvent washing or heat treatment and the carbon coating applied. Various methods may be used, including chemical vapor deposition, solution coating, and pyrolysis of organic polymers such as carbon pitch and phenolics. One preferred technique is chemical vapor deposition using decomposition of methane or other hydrocarbons. Another method is pyrolysis of an organic polymer coating such as phenolformaldehyde polymers cross-linked with such agents as the monohydrate or sodium salt of paratoluenesulfonic acid. Still another method uses toluene-soluble and toluene-insoluble carbon pitch to coat the fibers. After pyrolysis, a uniform carbon coating is present. Multiple applications may be used to increase the coating thickness.

Processing

As previously discussed, the black glass precursor is a polymer. It may be shaped into fibers and combined with reinforcing fibers or the black glass precursor may be used in solution for coating or impregnating reinforcing fibers. Various methods will suggest themselves to those skilled in the art for combining the black glass precursor with carbon-coated reinforcing fibers. It would, for example, be feasible to combine fibers of the polymer with fibers of the reinforcing material and then to coat the resulting fabric or mat. Alternatively, the reinforcing fibers could be coated with a solution of the polymer and then formed into the desired shape. Coating could be done by dipping, spraying, brushing, or the like. In still another embodiment, the resin transfer technique can be employed in which the reinforcing fibers are placed in a mold and then the black glass precursor is added to fill the mold before curing to form a green molded product.

In one method, a continuous fiber is coated with a solution of the black glass precursor polymer and then wound on a rotating drum covered with a release film which is easily separated from the coated fibers. After sufficient fiber has been built up on the drum, the process is stopped and the unidirectional fiber mat removed from the drum and dried. The resulting mat (i.e., "prepreg") then may be cut and laminated into the desired shapes.

In a second method, a woven or pressed fabric of the reinforcing fibers is coated with a solution of the black glass precursor polymer and then dried, after which it may be formed into the desired shapes by procedures which are familiar to those skilled in the art of fabricating structures with the prepreg sheets. For example, layers of prepreg sheets may be laid together and pressed into the needed shape. The orientation of the fibers may be chosen to strengthen the composite part in the principal load-bearing directions.

A third method for fabricating the polymer composite is by resin transfer molding. In resin transfer molding a mold with the required shape is filled with the desired reinforcement material. The reinforcement could be a perform having a 3-dimensional weave of fibers, a lay-up of fabric plies, a non-woven mat of chopped staple or bundled tows, or assemblies of whiskers, and such others as are familiar to those skilled in the art. The reinforcement material would be coated with the carbon to insure a weak bond between matrix and reinforcement in the final composite where improved tensile strength is desired. Carbon coating may be omitted where the end use does not require high tensile strength.

The filled mold is injected, preferably under vacuum, with the neat monomer solution with an appropriate amount of catalyst. The relative amounts of vinyl- and hydro-monomers will be adjusted to obtain the desired carbon level in the pyrolyzed matrix. The low viscosity (<50 centipoise) of the neat monomer solution is exceptionally well suited for resin impregnation of thick wall and complex shape components.

The filled mold is then heated to about 30° C.–150° C. for about ½–30 hours as required to cure the monomer solutions to a fully polymerized state. The specific cure cycle is tailored for the geometry and desired state of cure. For example, thicker wall sections require slower cures to prevent uneven curing and exothermic heat build-up. The cure cycle is tailored through control of the amount of catalyst added and the time-temperature cycle. External pressure may be used during the heating cycle as desired.

When the component is fully cured, it is removed from the mold. In this condition it is equivalent in state to the composite made by lamination and autoclaving of prepreg plies. Further processing consists of the equivalent pyrolysis and impregnation cycles to be described for the laminated components.

Solvents for the black glass precursor polymers include aromatic hydrocarbons, such as toluene, benzene, and xylene, and ethers, such as tetrahydrofuran, etc. Concentration of the prepregging solution may vary from about 10% to about 70% of resin by weight. Precursor polymer used in impregnating the fibers is usually prepared from solution polymerization of the respective monomers.

Since the precursor polymers do not contain any hydrolyzable functional groups, such as silanol, chlorosilane, or alkoxysilane, the precursor polymer is not water sensitive. No particular precaution is needed to exclude water from the solvent or to control relative humidity during processing.

Our resin ages very slowly when stored at or below room temperatures as is evident from their shelf life of more than three months at these temperatures. The resin is stable both in the solution or in the prepreg. Prepregs stored in a refrigerator for three months have been used to make laminates without any difficulty. Also, resin solutions stored for months have been used for making prepregs successfully.

Large and complex shape components can be fabricated from laminating prepregs. One method is hand lay-up which involves placing the resin-impregnated prepregs manually in an open mold. Several plies of prepregs cut to the desired shape are laid-up to achieve the required thickness of the component. Fiber orientation can be tailored to give maximum strength in the preferred direction. Fibers can be oriented unidirectionally [0], at 90° angles [0/90], at 45° angles [0/45 or 45/90], and in other combinations as desired. The laid-up plies are then bonded by vacuum compaction before autoclave curing. Another fabrication method is tape laying which uses pre-impregnated ribbons in forming composites. Our resins can be controlled to provide the desired tackiness and viscosity in the prepreg for the lay-up procedures.

After the initial forming, the composites may be consolidated and cured by heating to temperatures up to about 250° C. under pressure. In one method, the composited prepreg is placed in a bag, which is then evacuated and the outside of the bag placed under a pressure sufficient to bond the layered prepreg, say up to about 1482 kPa. The resin can flow into and fill up any voids between the fibers, forming a void-free green laminate. The resulting polymer-fiber composite is dense and is ready for conversion of the polymer to black glass ceramic. If an excessively cured prepreg is used, as is possible with the method of U.S. Pat. No. 4,460,640, there will be no adhesion between the plies and no flow of resin material and no bonding will occur.

Heating the composite to temperatures from about 800° C. up to about 1400° C. in an inert atmosphere (pyrolysis) converts the polymer into a black glass ceramic containing essentially only carbon, silicon, and oxygen. It is characteristic of the black glass prepared by pyrolyzing the cyclosiloxanes described above that the resulting black glass has a large carbon content, but is able to withstand exposure to temperatures up to about 1400° C. in air without oxidizing to a significant degree. Pyrolysis is usually carried out with a heating to the maximum temperature selected, holding at that temperature for a period of time determined by the size of the structure, and then cooling to room temperature. Little bulk shrinkage is observed for the black glass composites and the resulting structure typically has about 70–80% of its theoretical density.

Conversion of the polymer to black glass takes place between 430° C. and 950° C. Three major pyrolysis steps were identified by thermogravimetric analysis at 430° C.–700° C., 680° C.–800° C. and 780° C.–950° C. The yield of the polymer-glass conversion up to 800° C. is about 83%; the third pyrolysis mechanism occurring between 780° C. and 950° C. contributed a final 2.5% weight loss to the final product.

Since the pyrolyzed composite structure still retains voids, the structure may be increased in density by impregnating with a neat monomer liquid or solution of the black glass precursor polymer. The solution is then gelled by heating to about 50° C.–120° C. for a sufficient period of time. Following gelation, the polymer is pyrolyzed as described above. Repeating these steps, it is feasible to increase the density up to about 95% of the theoretical.

The above procedures will be illustrated in more detail in the examples of co-pending application U.S. Ser. No. 07/426,820. The examples below illustrate the advantages obtained by applying a carbon coating to the refractory fibers prior to contacting them with the black glass precursors and the formation of reinforced black glass articles by resin transfer molding.

EXAMPLE 1

Polymer Precursor Preparation

The cyclosiloxane having silicon-vinyl bond was poly(vinylmethylcyclosiloxane) (ViSi). The cyclosiloxane with a silicon-hydride bond was poly(methylhydrocyclosiloxane) (HSi). Both cyclosiloxanes were mixtures of oligomers, about 85% by weight being the cyclotetramer with the remainder being principally the cyclopentamer and cyclohexamer. A volume ratio of 59 ViSi/41 HSi was mixed with 22 wt. ppm of platinum as a platinum-cyclovinylmethylsiloxane complex in toluene to give a 10 vol. percent solution of the cyclosiloxane monomers. The solution was heated to reflux conditions (about 110° C.) and refluxed for about 2 hours. Then, the solution was concentrated in a rotary evaporator at 50° C. to a 25–35% concentration suitable for use in prepregging. The resin produced was poly(methylmethylenecyclosiloxane) (PMMCS). It was hard and dry at room temperature, but it was flowable at temperatures of about 70° C. or higher and thus suitable for use as a B stage resin.

EXAMPLE 2

Preparation of Test Specimens

A 26 wt. % poly(methylmethylenecyclosiloxane) (PMMCS) solution in toluene was used for making a prepreg. The viscosity of the resin solution was 2.98 centipoise. Carbon-coated continuous ceramic grade Nicalon ® tow containing 500 monofilaments (a silicon carbide fiber supplied by Dow-Corning) was impregnated with the PMMCS resin by passing the tow through the resin solution. The carbon coating had been applied using chemical vapor deposition and was 0.1 to 0.3 μm thick. The sizing for the tow was poly (vinyl alcohol) (PVA). The impregnated tow was formed into a prepreg by laying up the tow on a rotating drum. The prepreg contained 25.1% by weight of PMMCS and 74.9% by weight fiber. The areal weight, which is defined as the weight of fiber per unit area in the prepreg, was 308 gm/m$^2$.

6"×3.75" plies were cut from the prepreg. Eight piles were laid-up unidirectionally to form a laminate. This [0]$_8$ laminate was consolidated using the following procedure:

1. compacting under vacuum at room temperature for ½ hour,
2. debulking at 55° C.–65° C. for ½ hour under vacuum,
3. heating to 150° C. at 100 psi (689.7 kPa gauge) nitrogen pressure over two hours, and
4. cooling to room temperature.

The resin flowed and solidified during the autoclave curing. Loss of the resin through bleeding was estimated to be less than 2% with respect to the total weight of the laminate.

The consolidated green laminate was then machine cut into 0.26"×2.00" (6.6 mm×50.8 mm) test bars with average thickness of 0.086" (2.18 mm). The green test bars were then pyrolyzed in flowing nitrogen (flowrate=ca. 700 cubic cm per minute) to convert the PMMCS into black glass matrix composites using the following heating program:

1. heat to 850° C. in 8 hours,
2. hold at 850° C. for 1 hour, and
3. cool to room temperature over 8 hours.

The density of the as-pyrolyzed test bar was 1.7 gm/cc with a char yield of 96.8%. The test bars were then infiltrated with the neat monomer liquid without solvent. After gelling the sol at 50°–70° C., the infiltrated bars were then pyrolyzed using the same program as described above. A total of six impregnations were used to increase the density of the composite to about 2.13 gm/cc. Bars impregnated six times contained 60% Nicalon ® fiber by volume. Open porosity was estimated to be about 7.1%.

EXAMPLE 3

Testing for Flexural Strength 4-point bend tests were performed on the carbon-coated Nicalon ® reinforced black glass bars prepared in Example 2 using an Instron tester. The outer span of the fixture was 1.5 inches (38.1 mm) with 0.75 inches (19 mm) inner span, giving a span-to-depth ratio of 17.5. Flexural strengths and densities for various levels of impregnation are summarized below.

| Impregnations | # of Samples | Strength MPa (sdev) | density gm/cc (sdev) |
|---|---|---|---|
| 1 | 3 | 35.85 (9) | 1.92 (.24) |
| 2 | 3 | 86.87 (8.3) | 1.91 (.01) |
| 3 | 4 | 123.4 (25.5) | 1.97 (0.03) |
| 6 | 4 | 631.6 (117) | 2.13 (0.05) |

Samples tested after 1, 2, and 3 impregnations showed deformation at the load points but did not break. The maximum load was used to calculate the strength. Samples impregnated six times achieved densities around 89.5% of theoretical. Fibrous fracture was observed for samples impregnated six times, which exhibited about 0.6% strain at maximum stress. For comparison, similar black glass composites prepared with uncoated Nicalon ® fibers had flexural strengths of 151.2 MPa, densities of 2.19 g/cc, strain at maximum stress of 0.14%, and exhibit brittle fracture. This example demonstrates the importance of carbon coatings on the increase in strength and toughness of the black glass matrix composites.

EXAMPLE 4

A consolidated green laminate was prepared using the procedure described in Example 2. Test bars that were 5.5 inches long by 0.4 inches wide by 0.07 inches thick (139.7 mm×10.16 mm×1.78 mm) were cut from the laminate and pyrolyzed. After five impregnation and pyrolysis cycles, these specimens had a density of 2.13 g/cc. These test bars were tested in four point bending mode using a lower span of 4.5 inches (114.3 mm) and an upper span of 2.25 inches (57.2 mm). Mean bend strength was 768.8 MPa with a strain at maximum stress of 0.9%. These samples exhibited fibrous fracture. A representative stress-strain curve for these test bars is shown in the Figure.

Nicalon ® fibers without a carbon coating were used to prepare SiC fiber reinforced black glass composites using a procedure similar to that described in Example 2. Test bars that were 4 inches by 0.5 inches by 0.065 inches (101.5 mm×12.7 mm×1.65 mm) were impregnated and pyrolyzed five times to a density of 2.13 g/cc. These bars were tested in four point bending mode using lower spans of 2 and 3 inches (50.8 mm and 76.2 mm) with upper spans of 1 and 1.5 inches (25.4 mm and 38.1 mm), respectively. The mean bend strength was 144.8 MPa with a strain at maximum stress of 0.14%. All samples exhibited brittle failure. A representative stress-strain curve for this brittle material is also shown in the Figure. This example demonstrates the importance of carbon coatings on the increase in strength and strain at maximum stress for the black glass matrix composites.

EXAMPLE 5

A consolidated green laminate was formed using the procedure in Example 2. Test bars 7.5 inches long by 0.4 inches wide (190.5 mm×10.2 mm) were cut from the panel and pyrolyzed. After 5 impregnation and pyrolysis cycles, a strain gage was mounted on one of the surfaces. This test bar was tested in three point bending geometry with a six inch (152.4 mm) span. The strain gage was on the tensile surface of the bar. Maximum flexural stress was observed at 737.7 MPa with a strain at maximum stress of 0.9%.

EXAMPLE 6

Black glass matrix composites with carbon-coated Nicalon ® were also impregnated with the PMMCS resin diluted with toluene. A solution having about 50 wt. % resin was used for infiltration. The amount of matrix material incorporated into the composite in the PMMCS solution process would be less than when the neat monomer is used for the same impregnation cycles. Therefore, the solution impregnated composites have lower densities than their corresponding neat liquid impregnated samples. Strengths and densities are summarized as below.

| Impregnations | # of Samples | Strength MPa (sdev) | density gm/cc (sdev) |
| --- | --- | --- | --- |
| 2 | 4 | 73.1 (8.3) | 1.91 (0.06) |
| 4 | 3 | 187.5 (22.8) | 2.02 (0.05) |
| 5 | 4 | 261.3 (64.8) | 2.03 (0.06) |

These bars deformed under the load points but did not fracture.

EXAMPLE 7

A set of carbon-coated Nicalon ® test bars were prepared following the same procedure as described in Example 2. The total weight of the green test bars was 45.0193 gm. After five impregnations, the final total weight of the test bars was 54.8929 gm, an increase of 21.3% with respect to the green state. Fiber content in the infiltrated samples was 59.2 vol. %, or 62.8 wt. %. The density of these samples was 2.17 gm/cc, about 90.5% theoretical.

Room temperature 3-point bend tests on 9 samples using a span/depth ratio of 23.5 gave an average strength of 765.3 MPa (48.3 sdev). The specimens tested in 3-point bend failed in tensile mode and exhibited fibrous failure.

Five bars were heat-treated in stagnant air at 800° C. for 16 hours. After the oxidation, the samples lost about 1% in weight. A room temperature 4-point bend test showed brittle failure with bend strength of 135.1 MPa (standard deviation = 15.2 MPa). These results indicate loss of carbon interface and oxidation of the silicon carbide fibers, resulting in strong bonding between fiber and matrix.

Black glass-carbon coated Nicalon ® composite test bars aged at 315° C., 350° C., 400° C., and 450° C. for 60 hours in stagnant air were flexure tested at room temperature and elevated temperatures.

| Aging Temperature | Test Temperature | Flexural Strength (MPa) |
| --- | --- | --- |
| none | Room Temp. | 806.7 |
| 315° C. | Room Temp. | 806.7 |
| 350° C. | Room Temp. | 455.1 |
| 350° C. | 350° C. | 489.5 |
| 400° C. | Room Temp. | 289.6 |
| 400° C. | 400° C. | 337.8 |
| 450° C. | Room Temp. | 324 |

Samples aged below 450° C. exhibited fibrous fracture. Full strength is retained for heat treatment in air below 315° C., whereas lower strengths at higher temperatures indicate the carbon layer has been degraded. Although the overall strengths are degraded by aging, samples tested at the aging temperature have strengths identical within experimental error to the room-temperature strengths.

EXAMPLE 8

Test Specimens by Resin-Transfer Molding

Nicalon ® woven fabric plies cut to shape, with or without carbon coating, are stacked or placed into a 152.4 mm × 152.4 mm × 2.54 mm mold and a 45 wt. % solution of PMMCS precursors is introduced to fill the mold. The solution is 61 volume percent ViSi and 39 volume percent SiH and is mixed with about 10 wt. ppm of the platinum complex used in Example 1. By heating to about 55° C. over 5 hours the solution is gelled to form a green composite, which is removed from the mold, cut into test bars 152.4 mm long by 10.2 mm wide, and pyrolyzed at temperatures up to 850° C. as previously described. Further improvement in density is obtained by subsequent impregnations with neat monomer liquid as previously described. The samples are then available for testing.

EXAMPLE 9

Resin-Transfer Molding

A Nextel ® 440 (from 3-M) Techniweave was used for resin transfer molding. A 63.5 mm × 50.8 mm × 5.1 mm Techniweave was cut and weighed to be 18.40 gm. Black glass precursor liquid consisting of 61% vinylmethylcyclosiloxane and 39% hydromethylcyclosiloxane was mixed with about 10 ppm soluble Pt catalyst complex as in Example 1. The viscosity of the precursor liquid is about 1 centipoise. The weave was placed in a jar and vacuum infiltrated with the liquid. The infiltrated weave was gelled by heating at 55° C. for 5 hours, forming a consolidated green composite. The green composite was removed from the jar and pyrolyzed to 850° C. in flowing nitrogen to effect black glass conversion. The as-fabricated composite was reimpregnated with the same precursor liquid to increase the density. The bulk density of the Nextel ® 440 Techniweave preform was about 1.10 gm/cc. After a total of 5 impregnations, the density was increased to 2.07 gm/cc with 9.5% open porosity.

EXAMPLE 10

RESIN TRANSFER MOLDING 6.35 mm long alumina FP staple was packed into a 57.2 mm diameter cylindrical bronze cup, using a uniaxial press. The amount of FP staple was 142.1 gm. The packed staple block was vacuum infiltrated with a solution containing 61 vol. % ViSi and 39 wt. % SiH and about 10 ppm soluble Pt catalyst samples. The monomers are gelled at 55° C. for 12 hours and further hardened at 110° C. for 2 hours. The consolidated block was then removed from the cup and pyrolyzed in flowing nitrogen. The heating procedure included heating to 400° C. in 10 hours, from 400° C. to 500° C. in 15 hours, from 500° C. to 850° C. in 25 hours, and cooling to room temperature in 12 hours. The as-pyrolyzed block weighed 192.1 gm and was hard and rigid. No macrocracks were observed. The block was cut in half for inspection of interior morphology. Uniform distribution of staple and matrix material across the interior cross-section was found. The density of the block was estimated to be about 1.95 gm/cc. After a total of 6 impregnation/pyrolysis cycles, the density of the sample was 2.50 gm/cc with open porosity of 13%.

We claim:
1. A method of preparing fiber reinforced glass composites comprising:
(a) reacting (1) a cyclosiloxane monomer having the formula

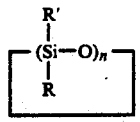

where n is an integer from 3 to 30, R is hydrogen, and R' is an alkene of from 2 to 20 carbon atoms in which one vinyl carbon atom is directly bonded to silicon or (2) two or more different cyclosiloxane monomers having the formula of (1) where for at least one monomer R is hydrogen and R' is an alkyl group having from 1 to 20 carbon atoms and for the other monomers R is an alkene from 2 to 20 carbon atoms in which one vinyl carbon is directly bonded to silicon and R' is an alkyl group of from 1 to 20 carbon atoms, said reaction taking place in the presence of an effective amount of hydrosilylation catalyst;
(b) applying the reaction product of (a) to at least one refractory fiber having a carbon coating about 0.01 μm to 5 μm thick and selected from the group consisting of boron, silicon carbide, graphite, silica, quartz, S-glass, E-glass, alumina, aluminosilicate, boron nitride, silicon nitride, boron carbide, titanium boride, titanium carbide, zirconium oxide and zirconiatoughened alumina to form a prepreg;
(c) laying-up plies of the prepreg of (b) to form a green structure;
(d) curing the green structure of (c) at a temperature not greater than 250° C.;
(e) pyrolyzing the cured structure of (d) at a temperature of about 800° C. to about 1400° C. in non-oxidizing atmosphere;
(f) recovering the pyrolyzed product of (e) as the fiber reinforced glass composite;
(g) impregnating the pyrolyzed product of (f) with the reaction product of (a);
(h) pyrolyzing the impregnated product of (g) at 800° C.-1400° C.;
(i) repeating steps (g) and (h) to achieve the desired density.

2. The method of claim 1 wherein the pyrolysis of (e) is carried out at a temperature of about 850° C.

3. The method of claim 1 wherein said carbon coating is deposited by chemical vapor deposition.

4. The method of claim 1 wherein said carbon coating is a pyrolyzed organic polymer.

5. The method of claim 4 wherein said pyrolyzed organic polymer is a pyrolyzed carbon pitch.

6. The method of claim 4 wherein said pyrolyzed organic polymer is a pyrolyzed phenol-formaldehyde polymer.

7. The method of claim 1 wherein said refractory fibers of (b) are in the form of a woven fabric.

8. The method of claim 1 wherein said refractory fibers of (b) are unidirectional and continuous.

9. A method of preparing fiber reinforced glass composites comprising:
(a) placing into a mold at least one refractory fiber, optionally having a carbon coating about 0.01 μm to 5 μm thick and selected from the group consisting of boron, silicon carbide, graphite, silica, quartz, S-glass, E-glass, alumina, aluminosilicate, boron nitride, silicon nitride, boron carbide, titanium boride, titanium carbide, zirconium oxide, and zirconia-toughened alumina;
(b) filling the mold of (a) with (1) a cyclosiloxane monomer having the formula

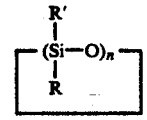

where n is an integer from 3 to 30, R is hydrogen, and R' is an alkene of from 2 to 20 carbon atoms in which one vinyl carbon atom is directly bonded to silicon or (2) two or more different cyclosiloxane monomers having the formula of (1) where for at least one monomer R is hydrogen and R' is an alkyl group having from 1 to 20 carbon atoms and for the other monomers R is an alkene from 2 to 20 carbon atoms in which one vinyl carbon is directly bonded to silicon and R' is an alkyl group of from 1 to 20 carbon atoms, and an effective amount of hydrosilylation catalyst;
(c) reacting the monomers of (b) at a temperature of about 30° C. to 150° C. to form a green composite;
(d) pyrolyzing the green composite of (c) at a temperature of about 800° C. to about 1400° C. in non-oxidizing atmosphere;
(e) recovering the pyrolyzed product of (d) as the fiber reinforced glass composite;
(f) impregnating the pyrolyzed product of (e) with the reaction product of the monomers of (b);
(g) pyrolyzing the impregnated product of (f) at 800° C.-1400° C.;
(h) repeating steps (f) and (g) to achieve the desired density.

10. The method of claim 9 wherein the pyrolysis of (d) is carried out at a temperature of about 850° C.

11. The method of claim 9 wherein said carbon coating is deposited by chemical vapor deposition.

12. The method of claim 9 wherein said carbon coating is a pyrolyzed organic polymer.

13. The method of claim 12 wherein said pyrolyzed organic polymer is pyrolyzed carbon pitch.

14. The method of claim 12 wherein said pyrolyzed organic polymer is a pyrolyzed phenol-formaldehyde polymer.

15. The method of claim 9 wherein said refractory fiber is a preform having a three-dimensional weave.

16. The method of claim 9 wherein said refractory fiber is a lay-up of fabric plies.

17. The method of claim 9 wherein said refractory fiber is a staple fiber.

18. The method of claim 9 wherein said refractory fiber is an assembly of whiskers.

* * * * *